July 18, 1944.  F. STEBLER  2,353,941
OLIVE SIZER
Filed Nov. 16, 1942  2 Sheets-Sheet 1

INVENTOR:
FRED STEBLER
BY
ATTORNEY

July 18, 1944. F. STEBLER 2,353,941
OLIVE SIZER
Filed Nov. 16, 1942 2 Sheets-Sheet 2
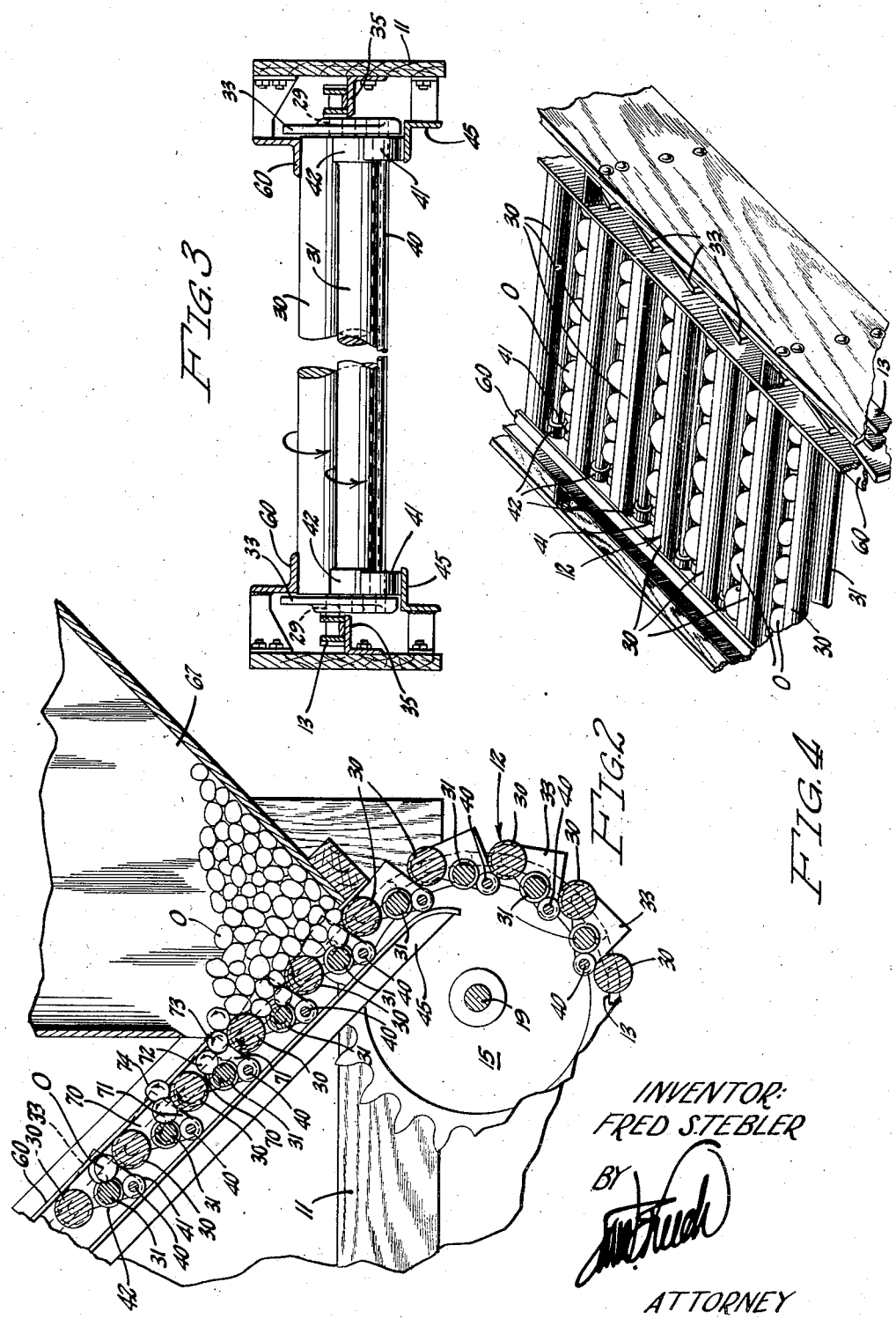
INVENTOR:
FRED STEBLER
BY
ATTORNEY Patented July 18, 1944

2,353,941

UNITED STATES PATENT OFFICE 2,353,941

OLIVE SIZER

Fred Stebler, Riverside, Calif., assignor to Food Machinery Corporation, San Jose, Calif., a corporation of Delaware Application November 16, 1942, Serial No. 465,731

10 Claims. (Cl. 209—106)

This invention relates to the arts of feeding and sizing fruit and is particularly useful when applied to ovaloid or nonspherical objects such as olives, lemons, apples, tomatoes, and the like.

A type of fruit sizer which has been found to have many advantages is the transverse sizer. This may be described in general as having members mounted transversely on an endless conveyor to form an endless series of transverse sizing valleys, the widths of which are progressively increased as they travel through a sizing zone, the fruit carried in the valleys dropping through the openings in the bottom of these valleys in accordance with the diameter of the fruit presented to the walls of the valley.

One difficulty had with transverse sizers as heretofore employed, has resulted from the lack of any means to prevent their being overcrowded. Fluctuations in the volume of fruit being handled in a string of equipment in a packing house thus frequently interfered with the accuracy of segregation accomplished by the sizer.

It is an object of the present invention to provide a transverse fruit sizer which cannot be over-crowded, and the sizing accuracy of which is therefore relatively uniform.

It is another object to provide such a fruit sizer which not only cannot be over-crowded but is capable of operating continuously at maximum capacity as long as fruit is available to be fed thereto at such rate.

In sizing ovaloid objects, such as olives or lemons, the common practice is to size these by their minimum diameters. Though transverse sizers are well equipped for handling this class of objects, it has not heretofore been found possible to secure the desired degree of accuracy while operating the sizer at maximum capacity, that is with each transverse valley containing a line of fruit extending from end to end of the valley.

Another object of the invention is to provide a transverse sizer which will efficiently size ovaloid objects while operating at its maximum capacity, as aforesaid.

In the sizer of my invention I combine in the members forming the transverse valleys thereof the functions of discarding the objects fed thereto in excess of that quantity which comprises the maximum capacity of the sizer, as aforesaid, the function of positioning each of the objects so retained in proper position on said members to be sized in accordance with its minimum diameter, and the function, performed while said fruit is so positioned, of sizing said fruit. Thus the same members on which any piece of fruit is positioned properly for sizing, operate thereafter to perform the sizing function without the position of the fruit having been disturbed between the time it is so positioned and the time it is sized.

The means in the sizer of my invention by which fruit is thus received, the excess discarded, and the balance properly positioned for sizing, is effective as a fruit feeder and is adapted to be used for feeding fruit in precise quantities (and uniformly positioned if that is desired) to any kind of device which requires fruit to be fed thereto.

It is accordingly another object of my invention to provide a fruit feeder by which fruit can be fed in precise quantities at a uniform rate.

A still further object of my invention is to provide a fruit feeder adapted for receiving fruit in bulk from a hopper and delivering said fruit therefrom at a relatively uniform rate.

The manner of accomplishing the foregoing objects, as well as further objects and advantages, will be made manifest in the following description taken in connection with the accompanying drawings, in which:

Fig. 2 is an enlarged, detailed operational view of a portion of Fig. 1, illustrating the bulk feeding of olives to the invention.

Fig. 3 is an enlarged, fragmentary, cross sectional view taken on the line 3—3 of Fig. 1.

Fig. 4 is a three-quarters perspective view of a section of an upwardly inclined portion of the conveyor of the invention.

Figure 1:
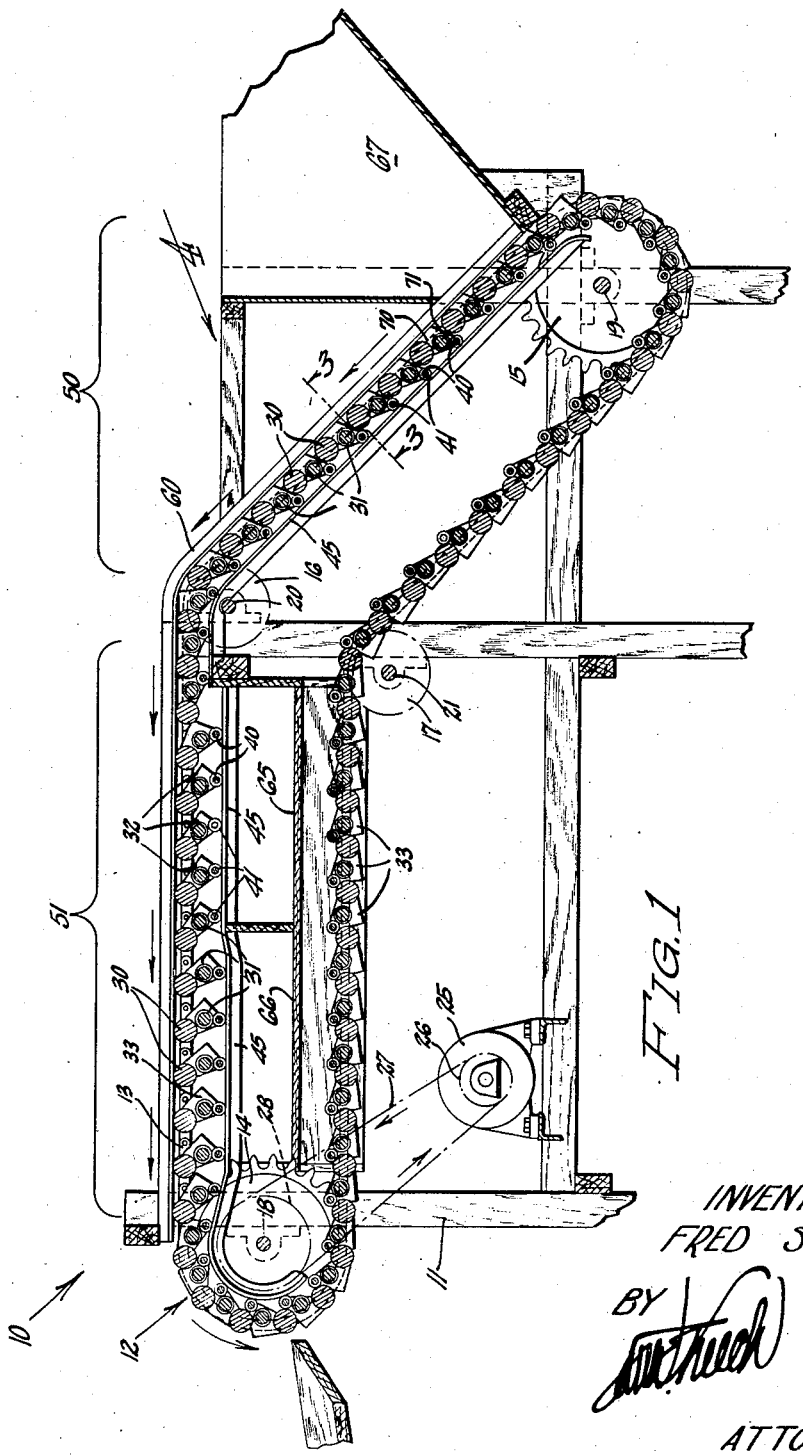
Fig. 1 is a diagrammatic, longitudinal, sectional view of a preferred embodiment of the invention.

Referring specifically to the drawings, the sizer 10 therein includes a frame 11 on which is mounted an endless conveyor 12 including endless chains 13, which are trained about sprockets 14 and 15 and sprockets 16 and 17 mounted respectively on shafts 18, 19, 20 and 21 which are journalled in suitable bearings provided on the frame 11. The conveyor 12 is adapted to be driven by a geared motor 25, the pinion 26 of which is connected by a chain 27 to a sprocket 28, diagrammatically shown in Fig. 1 as mounted on shaft 18.

Pivotally mounted between the chains 13, on pins 29 of the latter, is an endless series of rollers 30 which are spaced apart to permit a second series of rollers 31 to move into and from the spaces between the rollers 30 to provide sizing openings 32 between each of the rollers 31 and an adjacent one of the rollers 30.

Each of the rollers 31 is pivotally mounted between a pair of arms 33 which in turn are pivotally mounted on the pins 29 of the chains 13. For purposes of accuracy the chains 13 preferably travel on tracks 35 provided on the frame 11. Also pivotally mounted between the lower ends of each pair of arms 33 is a rod 40 carrying rollers 41 which have rolling engagement with friction bands 42 provided on spaced ends of rollers 31. The idle rollers 41 in turn rest on tracks 45 which are provided upon the sizer frame 11.

The upper course of the conveyor 12 includes an inclined section 50 and horizontal sizing section 51. In the inclined section 50 the tracks 45 are parallel with and uniformly spaced from the path followed by the conveyor 12, while in the sizing section the tracks 45 comprise lengths, each of which is disposed further away from the path of travel of the conveyor 12 than those preceding it, thereby progressively increasing the size of the openings 32 in the conveyor.

Also provided on the frame 11 and overlying and engaging opposite ends of the rollers 30 are friction tracks 60.

Provided on the frame to receive fruit of different sizes from the sizing section 51 of the conveyor 12 are chutes 65 and 66.

Disposed for receiving olives in bulk and feeding these directly to the inclined conveyor section 50 is a hopper 67.

Suitable means (not shown) are of course provided to separately receive sized olives from the chutes 65 and 66 as well as those passing over the left end of conveyor 12.

*Operation*

When energized, the motor 25 rotates the shaft 18 causing the upper flight of the conveyor 12 to travel in the direction of the arrows in Fig. 1. Friction between the idle rollers 41 and the rollers 31, and the tracks 45 during this travel causes rotation of the rollers 31 with the lower surfaces of these moving in the same direction as the upper flight of the conveyor and at a greater speed than said flight. Frictional engagement of the tracks 60 with rollers 30 cause the latter to rotate in the same direction as the rollers 31.

Olives O are now dumped in the hopper 67 to partially or completely fill this.

It is first desired to point out the features of the conveyor section 50 which render it capable of the precision feeding of olives in transversely disposed rows. This is effected by locating the guide tracks 45 for this conveyor section so that the axes of the rollers 31 will be disposed closer to these guide tracks than the axes of the rollers 30. The preferable arrangement, as disclosed in the drawings, is to have the rollers 30 mounted on the conveyor chains so that their axes intersect the pitch line of the chains whereas the axes of the rollers 31 are disposed below said pitch line.

This results in the forming of a valley 70 between each roller 31 and the roller 30 immediately thereabove in which none of the olives O can rest by gravity, and a valley 71 between said roller 31 and the roller 30 beneath and to the rear thereof in which valley olives delivered thereto are compelled by gravity to remain provided they are not forcibly expelled therefrom.

The valleys 70, as well as the valleys 71, are filled with olives O as the conveyor travels upwardly out from under the hopper 67. Any olives 72 which are thus located in one of the valleys 70, being unable to rest by gravity therein, naturally gravitate immediately downwardly into the valley 71 therebeneath. If that valley 71 is already filled with olives, the olive 72 will displace one of the olives in this valley, such as the olive 73 shown in Fig. 2. This will cause olive 73 to be ejected from the valley 71 and to gravitate rearwardly over the roller 30 forming the bottom wall of this valley. Fig. 2 also shows an olive 74 being thus ejected from one of the valleys 71 and illustrates how an olive thus ejected is always spilled backwardly over the roller 30 of such a valley so that the only olives remaining in this valley comprise just a sufficient quantity to form a contiguous row of olives extending from one end of this valley to the other.

The result of the action described is to assure that each valley 71 contains just that amount of olives, with no excess, which is necessary to fill that valley. Thus when these olives are carried into the sizer conveyor section 51 and the tracks 45 progressively lower the rollers 31 and enlarge the width of the valleys 71, there is never more than a single layer of fruit in any of these valleys to interfere with the proper sizing of the fruit. On the other hand each of these valleys is always completely filled with fruit so that the sizer 10 handles the maximum quantity of fruit for which it is designed.

It is a particularly valuable feature of my invention that the fruit is thus delivered, in the precise quantity necessary for efficient sizing in the section 51, to the valleys 71 in which the sizing function subsequently is performed. Where ovaloid objects such as olives or lemons are being sized, the conveyor section 50 not only facilitates the delivery of the precise amount of fruit to each valley which it can efficiently handle but also aligns the fruit in each said valley so that the longitudinal axis of each piece of fruit is parallel with the valley. This assures that the sizing function, when performed by the rollers forming this valley, will be in accordance with the smallest diameter of each piece of fruit sized.

It is desired to point out further that the precise feeding of fruit accomplished by the conveyor section 50 may be employed in other connections than with delivering fruit to a sizer such as the sizing section 51. For instance, it might be employed to deliver fruit in precise quantities to a pitting machine or to a can filler.

It is also desired to point out that while the rollers 31 are preferably rotated positively while in the conveyor section 50 as indicated in Fig. 2, it might be desirable in some circumstances that these rollers be stationary in this conveyor section or merely be idly rotatable.

In order for the conveyor or feed section 50 to perform its function of discarding fruit in excess of the amount necessary to just fill each of the valleys 71 this section must be inclined upwardly towards the sizing section 51. The angle of this inclination must be sufficient to cause discarded fruit to gravitate downwardly in the opposite direction to that in which the conveyor travels. Where the term "relatively steeply inclined" is used in the claims this is to be understood as calling for an angle of inclination in the conveyor which will produce this rearward gravitation of fruit displaced from the valleys 71 in the section 50.

What I claim is:

1. In a sizer the combination of: an endless conveyor mounting two endless series of rollers, one series of rollers being pivotally mounted on said conveyor and travelling uniformly along the path thereof and the other series of said rollers being swingably mounted on said conveyor to be movable into and from the spaces between said first series of rollers; means for rotating said first series of rollers so that the bottom surfaces thereof travel in the same direction as said conveyor at a faster rate than said conveyor travels in said direction; the rollers of said first series being spaced to allow the rollers of said second series to swing upwardly therebetween to form fruit-supporting valleys; and means for rotating the rollers of said second series in the same direction as the rollers of said first series and permitting the rollers of said second series to swing downwardly to form sizing openings in the valleys between the rollers of said first series and the rollers of said second series, a portion of said conveyor for receiving fruit thereon before said sizing commences being relatively steeply inclined upwardly, the rotation of said rollers as aforesaid in said fruit receiving portion causing excess fruit fed thereto to be discarded rearwardly so that no excess fruit is present in the valleys when the sizing of fruit therein takes place as aforesaid.

2. In a sizer the combination of: an endless conveyor mounting two series of rollers, the rollers of the first series being pivotally mounted on said conveyor in spaced relation to admit the rollers of the second series therebetween to form fruit-supporting valleys; means for rotating the rollers of both series aforesaid so that the lower surfaces travel in the same direction as and at a higher rate than said conveyor travels; and means for shifting each of the rollers of said second series downwardly to space it from one of the adjacent rollers of said first series a sufficiently greater distance than it is spaced from the other of said adjacent rollers to provide sizing openings, a portion of said conveyor for receiving fruit thereon before said sizing openings are formed, being relatively steeply inclined upwardly, the rotation of said rollers as aforesaid in said fruit receiving portion causing excess fruit fed thereto to be discarded rearwardly so that no excess fruit is present in the valleys when the sizing of fruit takes place as aforesaid.

3. In combination: an endless travelling conveyor, a portion of which is inclined relatively steeply upwardly from horizontal and which mounts two series of rollers, the first series being rotatively mounted on said conveyor in spaced relation to admit the rollers of said second series therebetween, the plane tangent with the upwardly disposed surfaces of said second series of rollers being below the plane tangent to the upwardly disposed surfaces of said first series of rollers; means for rotating both of said series of rollers so that the downwardly disposed surfaces thereof travel in the same direction as and at a faster rate than said conveyor; and means for feeding fruit onto said inclined portion of said conveyor.

4. In combination: an endless travelling conveyor, a portion of which is inclined relatively steeply upwardly from horizontal and which mounts two series of rollers, the first series being rotatively mounted on said conveyor in spaced relation to admit the rollers of said second series therebetween, the diameter of said second series of rollers being less than the diameter of said first series of rollers, and the plane tangent with the upwardly disposed surfaces of said second series of rollers being below the plane tangent to the upwardly disposed surfaces of said first series of rollers; means for rotating both of said series of rollers so that the downwardly disposed surfaces thereof travel in the same direction as and at a faster rate than said conveyor; and means for feeding fruit onto said inclined portion of said conveyor.

5. In a sizer the combination of: an endless conveyor mounting two endless series of rollers, one series of rollers being pivotally mounted on said conveyor and travelling uniformly along the path thereof and the other series of said rollers being swingably mounted respectively about the axes of said first series of rollers; means for rotating said first series of rollers so that the bottom surface thereof travels in the same direction as said conveyor at a faster rate than said conveyor travels in said direction, adjacent rollers of said first series being spaced to allow the rollers of said second series to swing upwardly therebetween; idle rollers mounted in rolling contact with said second series of rollers; and tracks on which said idle rollers roll so as to rotate said second series of rollers in the same direction as the said first series of rollers, and to permit the rollers of said second series to swing about the respective rollers of said first series to cause sizing openings to be formed between each roller of the second series and an adjacent roller of the first series.

6. In combination: an endless travelling conveyor, a portion of which is inclined relatively steeply upwardly from horizontal and which mounts two series of rollers, the first series being rotatively mounted on said conveyor in spaced relation to admit the rollers of said second series therebetween, the diameter of said second series of rollers being less than the diameter of said first series of rollers, and the plane tangent with the upwardly disposed surfaces of said second series of rollers being below the plane tangent to the upwardly disposed surfaces of said first series of rollers; means for rotating said first series of rollers so that the downwardly disposed surfaces thereof travel in the same direction as and at a faster rate than said conveyor; and means for feeding fruit onto said inclined portion of said conveyor.

7. In combination: an endless travelling conveyor, a portion of which is inclined relatively steeply upward from horizontal and on which is rotatably mounted a series of rollers, said rollers being spaced apart; a series of members disposed between the respective rollers of the aforesaid series and spaced downwardly from a plane tangent to the upwardly disposed surfaces of said rollers; means for rotating said rollers so that the downwardly disposed surfaces thereof travel in the same direction as and at a faster rate than said conveyor; and means for feeding fruit onto said inclined portion of said conveyor.

8. In a sizer the combination of: an endless conveyor mounting two series of rollers, the rollers of the first series being pivotally mounted on said conveyor in spaced relation to admit the rollers of the second series therebetween; track means disposed above the path of travel of said conveyor and engaging the rollers of said first series to rotate said rollers to cause the lower surfaces thereof to travel in the same direction as and at a higher rate than said conveyor travels; tracks disposed below the path of travel of said conveyor; a series of idle rollers disposed in rolling engagement with the rollers of said second series and said lower tracks to rotate said second series of rollers in the same direction as said first series of rollers rotate; and means for spacing each of the rollers of said second series from one of the adjacent rollers of said first series a greater distance than it is spaced from the other of said adjacent rollers to provide sizing openings.

9. In combination: an endless travelling conveyor, a portion of which is inclined relatively steeply upward from horizontal and which mounts two series of rollers, the first series being rotatively mounted on said conveyor in spaced relation to admit the rollers of said second series therebetween, the plane tangent with the upwardly disposed surfaces of said second series of rollers being below the plane tangent to the upwardly disposed surfaces of said first series of rollers; track means disposed above the path of travel of said conveyor and engaging said first series of rollers; track means disposed below the path of travel of said conveyor; a series of idle rollers disposed in rolling engagement with the rollers of said second series and said lower track means, said track means thus causing all of said rollers to rotate so that their downwardly disposed surfaces travel in the same direction as and at a faster rate than said conveyor; and means for feeding fruit onto said inclined portion of said conveyor.

10. In a sizer the combination of: an endless conveyor; rollers mounted in pairs on said conveyor for forming an endless series of transverse sizing valleys having sizing openings; means for causing said conveyor to travel over an endless path; means for causing said rollers to rotate as said conveyor travels so that the lower surface of said rollers move in the same direction as and at a faster rate than said conveyor; means for progressively increasing the width of said sizing openings during the travel of said conveyor through a sizing zone, said path having a feeding zone in which said path has a relatively steep upward inclination toward said sizing zone; and means for delivering an over-supply of fruit to said valleys when the latter are disposed in said feeding zone, the inclination of said conveyor in said feeding zone cooperating with the rotation of said rollers to discard from said valleys all of the fruit fed thereto as aforesaid in excess of just enough to form a single line of fruit filling each of said valleys, and by rotating said fruit to bring the major axes thereof into substantial alignment, the rollers on which each piece of said fruit is so positioned subsequently performing the sizing operation on said piece of fruit, said sizing therefore being substantially uniformly in accordance with the minimum diameter of said fruit.

FRED STEBLER.